J. BLANC.
PROCESS OF PURIFYING SULFUROUS ACID GAS.
APPLICATION FILED OCT. 14, 1910.
1,034,574.
Patented Aug. 6, 1912.
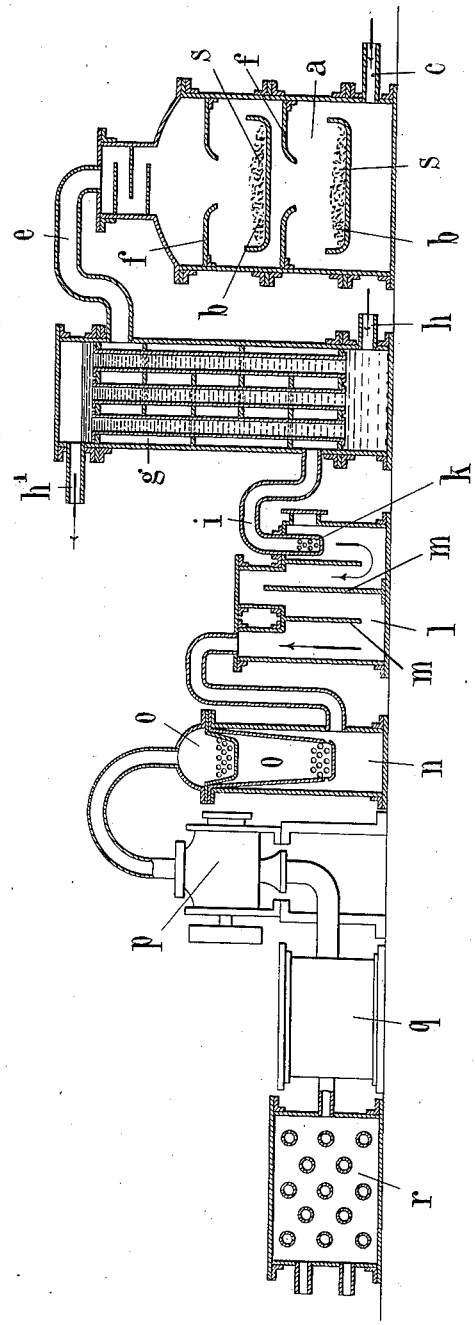

UNITED STATES PATENT OFFICE.

JULES BLANC, OF PARIS, FRANCE.

PROCESS OF PURIFYING SULFUROUS-ACID GAS.

1,034,574.  Specification of Letters Patent.  Patented Aug. 6, 1912.

Application filed October 14, 1910. Serial No. 586,993.

*To all whom it may concern:*

Be it known that I, JULES BLANC, a citizen of the Republic of France, residing at 183 Rue Lecourbe, Paris, France, have invented certain new and useful Improvements in Processes of Purifying Sulfurous-Acid Gas, of which the following is a specification.

The present invention is based on the well known properties of sulfurous acid gas and it comprehends the utilization of this gas, under new conditions of purity and dryness for destroying rats and insects, the conditions referred to being such as to render the ultimate transformation of the gas into sulfuric acid impossible in the places where it is used and, in consequence, to avoid all injury to the metals, pictures and fabrics resultant from its contact therewith.

The improved process consists, substantially, in passing the gases given off from the burning sulfur through a series of receptacles wherein the gases are cooled and dried and the solid particles contained in the gases are caught and deposited, the gases being alternately drawn into a vessel containing a purifying substance consisting of a mixture of glycerin and an alkaline solution, preferably a solution of caustic soda, from which vessel the then purified gases are led into a cooler, whence they are directed into the places to be treated. As above stated, the purifying substance consists of a mixture of glycerin and a solution of caustic soda in the proportion of 9.2 parts by weight of glycerin and 0.8 parts by weight of caustic soda, although these proportions may be varied, a 40° Baumé soda solution being preferably used. The purifying substance may be placed directly in the vessel in a liquid state, or may be used to impregnate a porous substance, which latter is then placed in the vessel.

To carry out the process, the apparatus shown diagrammatically and partly in section in the accompanying drawing may advantageously be employed.

In said drawing, $a$ indicates the sulfur burner, in which the sulfur, (in the form of flowers of sulfur, for instance), is placed on a series of plates $b$ arranged in vertical series, the necessary air entering through the inlet $c$. The roaster is provided with a series of baffles $f$ located at suitable points therein, so that the gases given off from the burning sulfur encounter these baffles and lose some of their solid particles before making their escape through the pipe $e$. From the roaster the gases pass, by way of said pipe $e$, into the space surrounding the tubes of a cooler $g$, through which tubes a current of water constantly flows, and then pass through a pipe $i$ into a dust-box $l$ containing a series of baffles $m$. Pipe $e$ opens into the upper portion of the vessel $g$ and pipe $i$ leads from the lower portion thereof and terminates in a strainer $k$, the water following an opposite course and entering said vessel through the pipe $h$ and leaving through the pipe $h$. The gases next pass into the strainer $n$ which contain a vertical series of strainers $o$, and on leaving this strainer pass into the ventilator or blower $p$, whence they are forced into the vessel $q$ that contains the purifying mixture above described. Thence the gases pass into the cooler $r$ and are finally directed therefrom into the places to be treated.

I claim as my invention:

1. A process of purifying sulfurous acid gas, comprising cooling and drying the gas, and subsequently passing it through a vessel containing a mixture of glycerin and an alkaline solution.

2. A process of purifying sulfurous acid gas comprising cooling and drying the gas and simultaneously removing the solid particles therefrom, and subsequently passing the gas through a vessel containing a mixture of glycerin and an alkaline solution.

3. A process of purifying sulfurous acid gas comprising passing the gas through a cooler and a dust box and simultaneously removing the solid particles therefrom, then straining the gas, then passing it into and through a blower, then passing it into and through a vessel containing a purifying mixture of glycerin and an alkaline solution, and finally passing it through a cooler.

In testimony whereof I affix my signature in presence of two witnesses.

JULES BLANC.

Witnesses:
MAURICE PICARD,
DEAN B. MASON.